United States Patent
Qiu et al.

(10) Patent No.: US 10,746,855 B2
(45) Date of Patent: Aug. 18, 2020

(54) MULTI-LINE LASER RADAR AND MULTI-LINE LASER RADAR CONTROL METHOD

(71) Applicant: SUTENG INNOVATION TECHNOLOGY CO., LTD., Shenzhen (CN)

(72) Inventors: Chunxin Qiu, Shenzhen (CN); Letian Liu, Shenzhen (CN)

(73) Assignee: Suteng Innovation Technology Co., LTD., Shenzhen (CN)

( * ) Notice: Subject to any disclaimer, the term of this patent is extended or adjusted under 35 U.S.C. 154(b) by 0 days.

(21) Appl. No.: 16/474,425

(22) PCT Filed: Oct. 18, 2017

(86) PCT No.: PCT/CN2017/106697
§ 371 (c)(1),
(2) Date: Jun. 27, 2019

(87) PCT Pub. No.: WO2018/121009
PCT Pub. Date: Jul. 5, 2018

(65) Prior Publication Data
US 2019/0339367 A1  Nov. 7, 2019

(30) Foreign Application Priority Data
Dec. 29, 2016  (CN) .......................... 2016 1 1246496

(51) Int. Cl.
*G01S 7/481* (2006.01)
*G01S 17/08* (2006.01)

(52) U.S. Cl.
CPC ............ *G01S 7/4815* (2013.01); *G01S 17/08* (2013.01)

(58) Field of Classification Search
CPC .......... G01S 17/08; G01S 17/02; G01S 17/42; G01S 7/4815
USPC ......................................................... 356/4.01
See application file for complete search history.

(56) References Cited

U.S. PATENT DOCUMENTS

2002/0167655 A1   11/2002   Friedman et al.

FOREIGN PATENT DOCUMENTS

| CN | 104035097 A | 9/2014 |
|---|---|---|
| CN | 105705964 A | 6/2016 |
| CN | 105785381 A | 7/2016 |
| CN | 105824029 A | 8/2016 |
| CN | 206362927 U | 7/2017 |
| CN | 107153193 A | 9/2017 |
| EP | 0665446 A2 | 8/1995 |

(Continued)

OTHER PUBLICATIONS

State Intellectual Property Office of the People's Republic of China, Office Action (Notice of Allowance) for Chinese Patent Application No. CN201611246496.6 dated Dec. 7, 2018.

(Continued)

*Primary Examiner* — Daniel L Murphy
(74) *Attorney, Agent, or Firm* — Rimon PC (57) ABSTRACT

Disclosed are a multi-line lidar and a control method therefor. The multi-line lidar comprises: a laser emitter (110) for emitting outgoing lasers, comprising a plurality of laser emitting boards (111, 211, 212, 211, 212, 213, 310 and 320), and an optical collimating unit (120) for collimating the outgoing lasers. Light-emitting surfaces of the plurality of laser emitting boards (111) are located in a focal plane (130) of the optical collimating unit (120).

6 Claims, 6 Drawing Sheets (56) References Cited

FOREIGN PATENT DOCUMENTS

| | | |
|---|---|---|
| EP | 665446 A2 | 8/1995 |
| JP | 2010091855 A | 4/2010 |

OTHER PUBLICATIONS

International Search Report dated Jan. 16, 2018 in the patent application PCT/CN2017/106697. 13 pages.

A multi-line lidar comprising a laser emitter and an optical collimating unit is provided, the laser emitter comprises a plurality of laser emitting boards, and light-emitting surfaces of the plurality of laser emitting boards are located in a focal plane of the optical collimating unit. —S110

The laser emitter emits outgoing laser beams. —S120

The optical collimating unit collimates the outgoing laser beams. —S130

Fig.6

MULTI-LINE LASER RADAR AND MULTI-LINE LASER RADAR CONTROL METHOD

RELATED APPLICATIONS

The present application is a US national phase application under 35 U.S.C. § 371 of international application PCT/CN2017/106697 filed on Oct. 18, 2017 titled Multi-line LIDAR and Control Method Therefor, which claims priority to Chinese patent application CN201611246496.6 filed on Dec. 29, 2016, the content of both applications being incorporated by reference in their entirety.

FIELD

The disclosure relates to the field of detection, in particular to a multi-line lidar and a control method therefor.

BACKGROUND

A lidar (light detection and ranging) is a radar system which emits laser beams to measure characteristic quantities such as position and velocity of a target. According to the working principle of the lidar, first, a detecting laser beam is emitted to the target; next, a received signal reflected back from the target is compared with the emitted signal and is appropriately processed, then information about the target can be acquired, for example, parameters such as distance, position, altitude, velocity, posture and even shape of the target.

A multi-line lidar is a type of lidar which emits laser through a semiconductor laser emitter and detects reflected optical signals. A multi-line lidar comprises a plurality of laser emitters each can measure a distance. Emitting circuit devices of laser emitters are complex and large in size, and cannot be stacked in a sufficiently large number in a small space. The number of laser beams, namely the number of stacked laser emitters per unit area, is a key factor affecting the vertical resolution of a multi-line lidar. Consequently, prior art multi-line lidars remain to be improved in their vertical resolution.

SUMMARY

Based on the above, it is necessary to provide a multi-line lidar and a control method therefor which can improve the vertical resolution of the multi-line lidar.

A multi-line lidar comprises: a laser emitter for emitting outgoing lasers which comprises a plurality of laser emitting boards; and an optical collimating unit for collimating the outgoing lasers. Light-emitting surfaces of the plurality of laser emitting boards are located in a focal plane of the optical collimating unit.

A multi-line lidar control method comprises the following steps:

providing a multi-line lidar comprising a laser emitter and an optical collimating unit; the laser emitter comprising a plurality of laser emitting boards; and light-emitting surfaces of the plurality of laser emitting boards being located in a focal plane of the optical collimating unit;

emitting outgoing laser beams by the laser emitter; and collimating the outgoing laser beams through the optical collimating unit.

According to the multi-line lidar and the control method therefor, a plurality of laser emitting boards are arranged on the focal plane of the optical collimating unit, the focal plane space resources of the optical collimating unit can be fully utilized, the number of the outgoing laser beams in the vertical direction is increased, and thus vertical resolution of the multi-line lidar is improved without decreasing thicknesses of the laser emitting boards.

BRIEF DESCRIPTION OF THE DRAWINGS

In order to illustrate the embodiments of the present disclosure or technical solutions in the prior art more clearly, the drawings adopted by the description of the embodiments or the prior art will be briefly described below. Obviously, the drawings in the following description illustrate only some embodiments of the present disclosure, and those skilled in the art can obtain drawings of other embodiments according to the drawings without creative work.

DETAILED DESCRIPTION OF THE EMBODIMENTS

In order to make the disclosure easily understood, the disclosure will be described more comprehensively hereinafter with reference to the drawings. Preferred embodiments of the disclosure are shown in the drawings. However, the disclosure may be embodied in many different forms and is not limited to the embodiments described herein. Rather, the purpose of providing the embodiments is to make the disclosure understood more thoroughly and comprehensively.

Unless otherwise defined, all technical and scientific terms used herein have the same meanings as those commonly understood by technicians in the technical field of the disclosure. The terms used in the specification herein are for the purpose of describing particular embodiments and are not intended to limit the disclosure. The term "and/or" used herein comprises any and all combinations of one or more related listed items.

Figure 1:
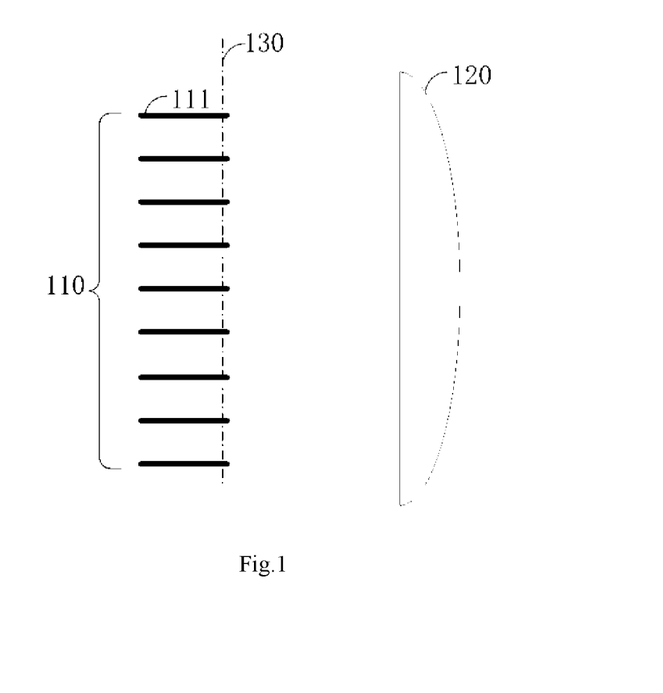
FIG. 1 is a schematic structural view of a multi-line lidar according to an embodiment.

As shown in FIG. 1, an embodiment provides a multi-line lidar comprising a laser emitter 110 for emitting outgoing lasers and an optical collimating unit 120 for collimating the outgoing lasers.

In the embodiment, the laser emitter 110 comprises a plurality of laser emitting boards 111, and light-emitting surfaces of the plurality of laser emitting boards 111 are located in a focal plane 130 of the optical collimating unit 120.

The laser emitting boards 111 can be PCBs and lasers arranged on the PCBs. The optical collimating unit 120 can be a single lens or a lens group.

According to the embodiment, the plurality of laser emitting boards 111 are arranged on the focal plane of the optical collimating unit, the focal plane space resources of the optical collimating unit 120 can be fully utilized, the number of beams of the outgoing lasers in the vertical direction is increased, and thus vertical resolution of the multi-line lidar is improved without decreasing thicknesses of the laser emitting boards.

Figure 2:
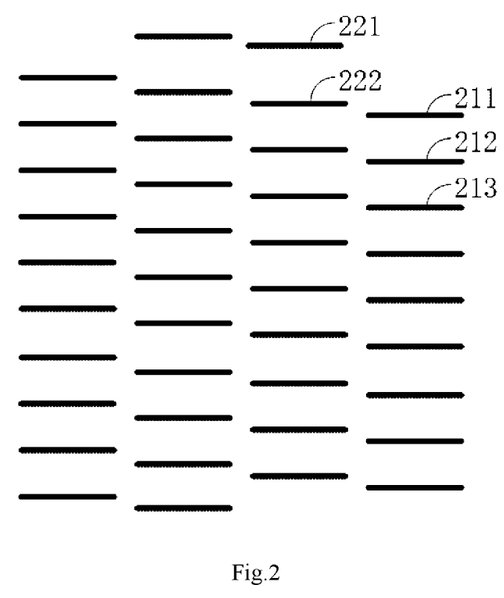
FIG. 2 is a schematic view of a focal plane of a multi-line lidar according to another embodiment.

According to another embodiment, a plurality of laser emitting boards comprise at least two columns of laser emitting boards, and each of the columns of laser emitting boards comprises at least two laser emitting boards. For example, as shown in FIG. 2, a plurality of laser emitting boards are arranged on a focal plane of a multi-line lidar and comprise four columns of laser emitting boards, and each of the columns of laser emitting boards comprises at least two laser emitting boards.

Specifically, in each of the columns of laser emitting boards, distances between every two adjacent laser emitting boards are equal. For example, as shown in FIG. 2, a distance between a first laser emitting board 211 of the fourth column and a second laser emitting board 212 of the fourth column is equal to a distance between the second laser emitting board 212 of the fourth column and a third laser emitting board 213 of the fourth column.

Specifically, distances between every two adjacent laser emitting boards in each of the columns of laser emitting boards are equal to distances between every two adjacent laser emitting boards in other columns of laser emitting boards. For example, as shown in FIG. 2, a distance between the first laser emitting board 211 of the fourth column and the second laser emitting board 212 of the fourth column is equal to a distance between a first laser emitting board 221 of the third column and a second laser emitting board 222 of the third column.

Specifically, each laser emitting board is parallel to the horizontal plane, and is staggered with respect to other laser emitting boards in a horizontal direction. As shown in FIG. 2, a horizontal extension line of each laser emitting board does not coincide with those of other laser emitting boards. The horizontal plane is perpendicular to the straight lines where the columns are in. A horizontal direction is parallel to the horizontal plane.

Figure 4:
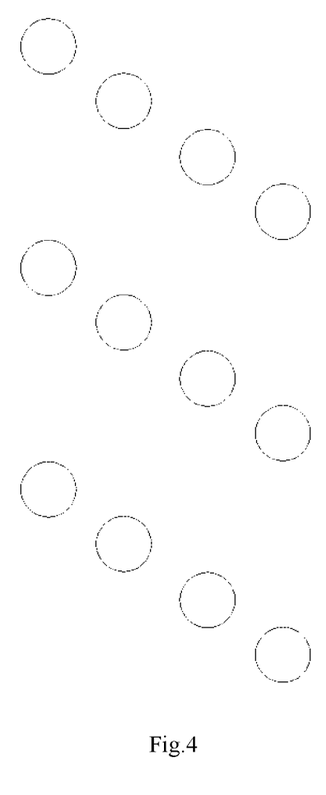
FIG. 4 is a schematic view of laser spots of a multi-line lidar according to the embodiment shown in FIG. 2.

As shown in FIG. 4, since the plurality of laser emitting boards are staggered horizontally, laser spots of the plurality of outgoing lasers at a certain distance are also staggered, which is equivalent to an increase of the number of the outgoing laser beams in the vertical direction which can improve vertical resolution.

If the vertical resolution within a certain angle close to the horizontal direction of the multi-line lidar is of particular interest, number of columns of lasers close to the center can be increased, while number of columns of lasers on the upper side and the lower side can be decreased, and thus cost can be reduced.

Figure 3:
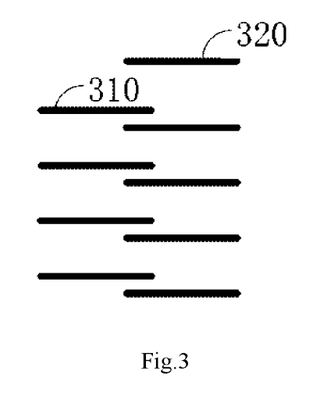
FIG. 3 is a detailed schematic structural view of a multi-line lidar according to another embodiment.

According to another embodiment, laser emitting boards of different columns are partially overlapped in the horizontal direction. For example, two columns of laser emitting boards are shown in FIG. 3, the projection of a first laser emitting board 310 of the first column on the horizontal plane and the projection of a first laser emitting board 320 of the second column on the horizontal plane are partially overlapped.

During practical application, due to different heights and positions of devices mounted on a laser emitting board, the height of the laser emitting board is not entirely consistent. Accordingly, although laser emitting boards in each column are closely arranged, if devices with low heights are mounted on edges of the laser emitting boards, then gaps between edges of the laser emitting boards in the column would be so large as to be able to be used by laser emitting boards in other columns. By virtue of such a way of arrangement, average space occupied by each of the columns of laser emitting boards can be reduced, more laser emitting boards can be arranged in the focal plane, and consequently vertical resolution of the lidar is improved.

According to the embodiment, lasers emitted by the laser emitting boards are different in outgoing angles after being collimated by the optical collimating unit, and the outgoing direction of each laser would be a connection line between the light-emitting surface of each laser emitting board and the optical center of the optical collimating unit.

Figure 5:
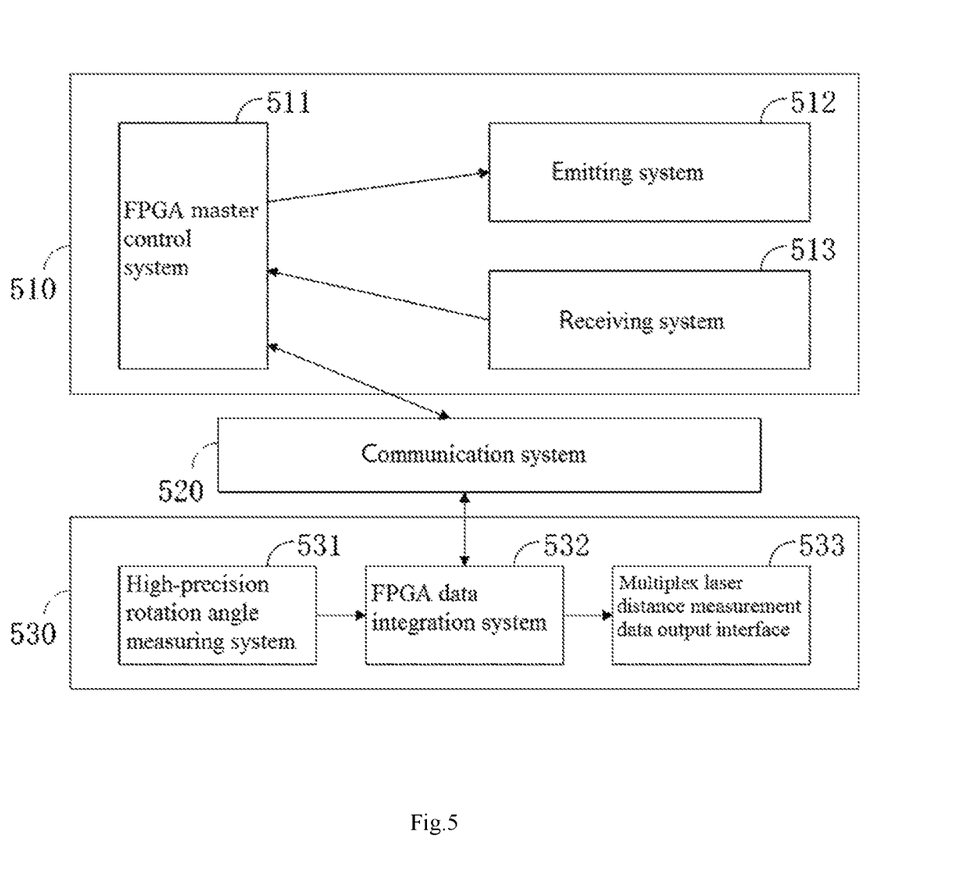
FIG. 5 is a detailed schematic structural view of a multi-line lidar according to another embodiment.

As shown in FIG. 5, in another embodiment, the multi-line lidar comprises a rotating component 510, a communication system 520 and a fixing component 530.

The rotating component 510 is provided with an FPGA master control system 511, an emitting system 512 and a receiving system 513.

The emitting system 512 comprises the laser emitter and the optical collimating unit provided in the above embodiments. The specific structure and functions of the emitting system 512 are as described above and will not be described herein.

The receiving system 513 according to the embodiment corresponds to the emitting system 512, that is, the receiving system 513 is used for receiving outgoing laser beams reflected back from an object being detected. Specifically, the outgoing laser beams are reflected by the object being detected and then received by laser sensors after passing through a focusing optical unit at a receiving end. The way of arrangement of the laser sensors is the same as that of the laser emitting boards and will not be described herein.

The communication system 520 can be a wireless or a wired communication system with energy transmission, and is used for communication between the rotating component 510 and the fixing component 530.

The fixing component 530 is provided with a high-precision rotation angle measuring system 531, an FPGA data integration system 532, a multiplex laser distance measurement data output interface 533 and the like.

For a multi-line lidar according to an embodiment of the disclosure, a plurality of laser emitting boards are arranged on the focal plane of the optical collimating unit of the emitting system 512, the focal plane space resources of the optical collimating unit can be fully utilized, the number of the outgoing laser beams in the vertical direction is increased, and thus vertical resolution of the multi-line lidar is improved without decreasing the thickness of the laser emitting boards.

Figure 6:
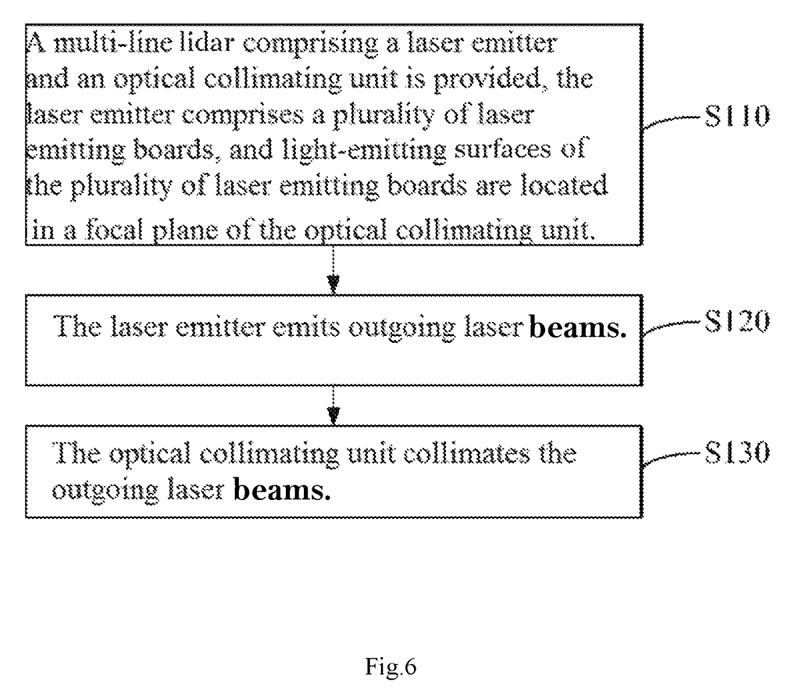
FIG. 6 is a flow chart showing a multi-line lidar control method according to another embodiment.

Corresponding to the abovementioned multi-line lidar, another embodiment further provides a multi-line lidar control method, comprises the following steps (See FIG. 6):

S110, a multi-line lidar is provided, the multi-line lidar comprising a laser emitter and an optical collimating unit. The laser emitter comprises a plurality of laser emitting boards, and light-emitting surfaces of the plurality of laser emitting boards are located in a focal plane of the collimating optical unit.

S120, outgoing lasers are emitted by the laser emitter.

S130, the outgoing laser beams are collimated through the optical collimating unit.

According to the multi-line lidar control method disclosed by the embodiment, a plurality of laser emitting boards are arranged on the focal plane of the optical collimating unit, the focal plane space resources of the optical collimating unit can be fully utilized, the number of the outgoing laser beams in the vertical direction is increased, and thus vertical resolution of the multi-line lidar is improved without decreasing thicknesses of the laser emitting boards.

Technical features of all the embodiments can be combined arbitrarily. To be brief and concise, not every possible combination of the technical features of the embodiments is described. However, any combination of the technical features shall be considered as falling within the scope of the specification as long as there is no contradiction.

Although the above-described embodiments are merely illustrative of several embodiments of the disclosure and are described in detail, they are not to be construed as limitation to the scope of the present disclosure. It should be noted that numerous variations and modifications would be readily apparent to those skilled in the art in the light of the disclosure without departing from the spirit and scope thereof, and would fall within the scope of the disclosure. Therefore, the scope of the disclosure should be determined by the appended claims.

The invention claimed is:

1. A multi-line lidar, comprising:
   a laser emitter for emitting outgoing laser beams, comprising a plurality of laser emitting boards; and
   an optical collimating unit for collimating the outgoing laser beams, wherein light-emitting surfaces of the plurality of laser emitting boards are located in a focal plane of the optical collimating unit;
   wherein the plurality of laser emitting boards comprise at least two columns of laser emitting boards, and each of the columns of laser emitting boards comprises at least two laser emitting boards; and
   wherein each laser emitting board is parallel to the horizontal plane, and is staggered with respect to other laser emitting boards in a vertical direction.

2. The lidar according to claim 1, wherein distances between every two adjacent laser emitting boards in each of the columns of laser emitting boards are equal.

3. The lidar according to claim 2, wherein distances between every two adjacent laser emitting boards in each of the columns of laser emitting boards are equal to distances between every two adjacent laser emitting boards in other columns of laser emitting boards.

4. The lidar according to claim 1, wherein projections of the laser emitting boards in different columns partially overlap in the horizontal direction.

5. A multi-line lidar control method, comprising:
   providing a multi-line lidar comprising a laser emitter and an optical collimating unit, wherein the laser emitter comprises a plurality of laser emitting boards, and light-emitting surfaces of the plurality of laser emitting boards are located in a focal plane of the optical collimating unit;
   emitting outgoing laser beams by the laser emitter; and
   collimating the outgoing laser beams through the optical collimating unit;
   wherein the plurality of laser emitting boards comprise at least two columns of laser emitting boards, and each of the columns of laser emitting boards comprises at least two laser emitting boards;
   wherein each laser emitting board is parallel to the horizontal plane, and is staggered with respect to other laser emitting boards in a horizontal direction.

6. The method according to claim 5, wherein projections of the laser emitting boards in different columns partially overlap in the horizontal direction.

* * * * *